US006337935B1

(12) United States Patent
Ford et al.

(10) Patent No.: US 6,337,935 B1
(45) Date of Patent: Jan. 8, 2002

(54) DISPERSED IMAGE INVERTING OPTICAL WAVELENGTH MULTIPLEXER

(75) Inventors: Joseph Earl Ford, Oakhurst; David Thomas Neilson, Plainsboro, both of NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/375,305

(22) Filed: Aug. 16, 1999

(51) Int. Cl.[7] .................................................. G02B 6/28
(52) U.S. Cl. ............................ 385/24; 385/15; 385/31; 385/33; 359/115; 359/127; 359/131
(58) Field of Search ............................. 385/15, 24, 31, 385/33, 37; 359/115, 127, 129, 130, 131

(56) References Cited

U.S. PATENT DOCUMENTS

| | | | | |
|---|---|---|---|---|
| 5,917,625 A | * | 6/1999 | Ogusu et al. | 359/130 |
| 5,960,133 A | * | 9/1999 | Tomlinson | 385/18 |
| 5,999,672 A | * | 12/1999 | Hunter et al. | 385/37 |
| 6,108,471 A | * | 8/2000 | Zhang et al. | 385/37 |

OTHER PUBLICATIONS

J.E. Ford and J.A. Walker, "Dynamic Spectral Power Equalization using micro–opto–mechanics", IEEE Photonics Technology Letters, Oct. 1998, vol. 10, No. 10.

* cited by examiner

Primary Examiner—Rodney Bovernick
Assistant Examiner—Sung Pak

(57) ABSTRACT

A method and apparatus for multiplexing and demultiplexing light signals of multiple wavelengths using two canceling dispersion stages with a stage between them which transforms the angular positions of the beams, the lateral positions of the beams, or both the angular and lateral positions of the beams. Light of multiple wavelengths is introduced through an input waveguide. The light then enters the first stage of the invention which disperses the signal. The dispersed signals then enter a second stage in which they are transformed. The transformed signals then enter a third stage where they are subject to the inverse of the dispersion performed in the first stage. In other words, if the third stage were placed immediately after the first stage, the third stage would nullify the dispersion of the first stage. However, adding the intervening transformation step results in only the simple linear dispersion being canceled in the system while the transformed part of the dispersion is retained. In specific examples of the invention, the intervening transformation step causes the resulting signals which are outputted from the third stage to remain coplanar with the input waveguide despite any displacement of the input waveguide in a direction orthogonal to both the direction of dispersion and the optical axis. This persistent alignment between the input and output waveguides reduces system performance degradation resulting from displacement caused by mechanical and thermal effects and also allows for multiple input/output combinations to be used consisting of stacked, linear arrays of fibers or waveguides.

16 Claims, 16 Drawing Sheets

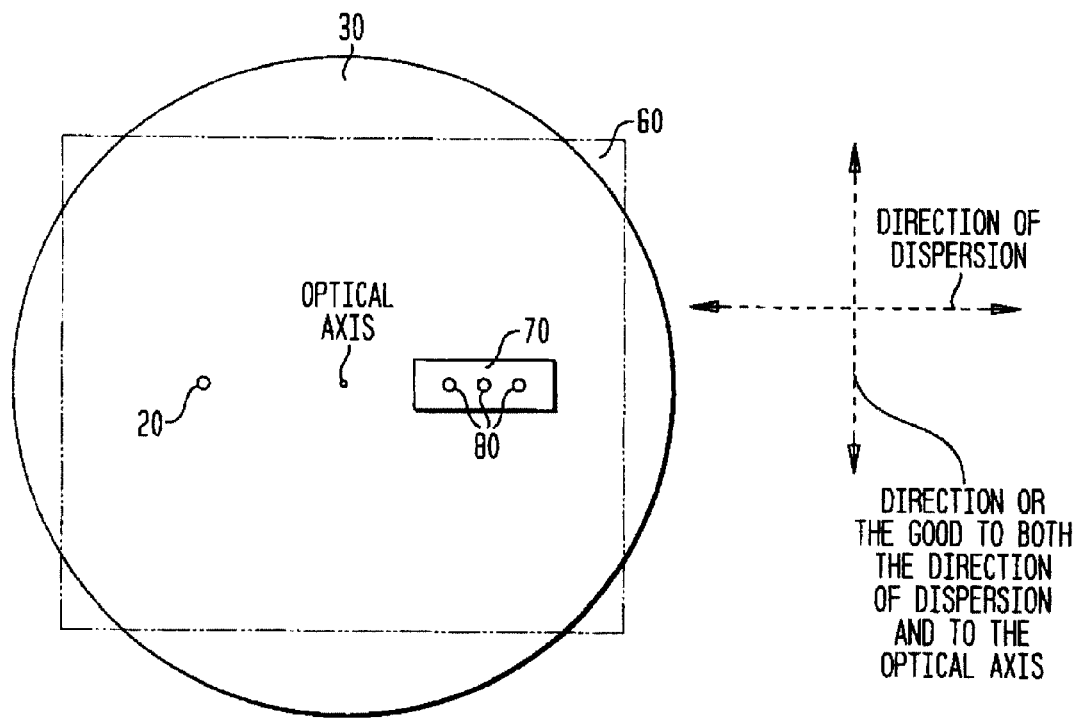
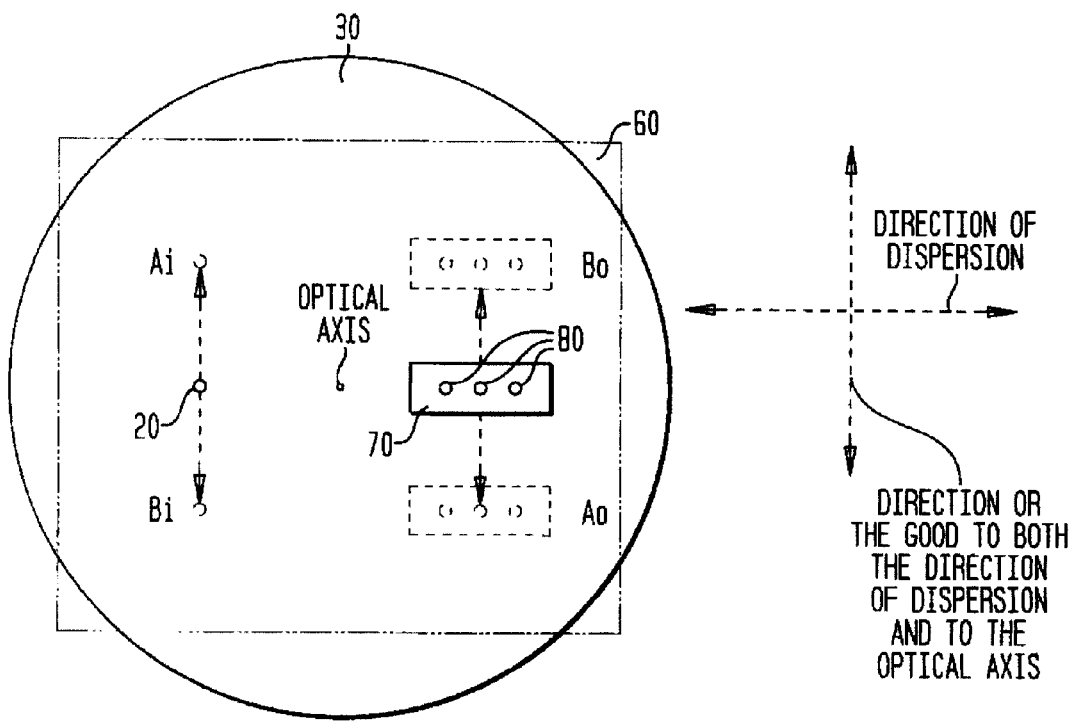

DIRECTION OF
DISPERSION

DIRECTION OF DISPERSION

DISPERSED IMAGE INVERTING OPTICAL WAVELENGTH MULTIPLEXER

FIELD OF THE INVENTION

The present invention relates generally to the field of fiber optic communications and specifically to the separation of wavelengths by dispersion using wavelength multiplexers.

BACKGROUND OF THE INVENTION

The use of wavelength multiplexers (MUX) to combine (multiplex) and separate (demultiplex) wavelengths within light signals is well known in the field of fiber optic communications, especially in wavelength division multiplexing (WDM) systems. Wavelength division multiplexing refers to the transmission of two or more light signals over a common path using a different wavelength for each signal.

FIG. 1 depicts a conventional, free-space wavelength MUX device. The figure shows the device performing a demultiplexing operation. An input waveguide 20 introduces a light signal 10 carrying multiple signals of different wavelengths. Light signal 10 is collimated by a first pass through a lens 30. The light then strikes a planar diffraction grating 40 at the back focal plane which disperses the separate wavelength signals and reflects them. Each wavelength signal leaves the grating 40 at a distinct angle. The separated light signals 50 are then focused by a second pass through the lens 30 onto an output plane 60 which is perpendicular to the direction of propagation such that each wavelength signal creates an optical focal spot whose position is linearly related to the optical wavelength. A linear array 70 of one or more output waveguides 80 is positioned at output plane 60 such that each wavelength signal illuminates, and is optically coupled to, only one output waveguide 80.

A major limitation of this conventional multiplexer arrangement is its low tolerance for displacement of the input and output waveguides in a direction orthogonal to both the direction of dispersion and to the optical axis. FIG. 2a depicts the conventional multiplexer arrangement of FIG. 1 from an overhead view. FIG. 2b depicts the conventional multiplexer arrangement of FIG. 1, without the planar diffraction grating 40, from a frontal view. FIG. 2c depicts the same view as FIG. 2b, with the position of the input waveguide displaced in a direction orthogonal to both the direction of dispersion and to the optical axis and the position of the output waveguides displaced to match the input.

Referring to FIG. 2c, if the input waveguide is displaced to a position $A_i$, the output waveguides must be displaced in the opposite direction to a position $A_o$ so as to allow them to continue to receive the separated light signals which originated from this input. The same is true if the input waveguide is moved in the other orthogonal direction to position $B_i$. The output waveguides must again be moved in the direction opposite to a position $B_o$ so as to allow them to continue to receive the separated light signals which originated from the input. Thus, where the input waveguide is displaced in an orthogonal direction as shown in FIG. 2c, for example as caused by mechanical or thermal effects, the output waveguides must be realigned with the input otherwise system performance will suffer.

SUMMARY OF THE INVENTION

The present invention consists of a new method and apparatus for multiplexing and demultiplexing light signals of multiple wavelengths using two canceling dispersion stages with a stage between them which transforms the angular positions of the beams or the lateral positions of the beams or both the angular and lateral positions of the beams.

In the present invention, a light signal of multiple wavelengths enters through an input waveguide. The signal is then dispersed by a first stage of the invention. The dispersed signals of wavelengths then enter a second stage of the invention which transforms the wavelengths. The transformed signals of wavelengths then enter a third stage of the invention which performs the inverse dispersion of the first stage. In other words, if this third stage were placed immediately after the first stage, the third stage would nullify the dispersion performed by the first stage. However, adding the intervening transformation step results in only the simple linear dispersion being canceled in the system while the transformed part of the dispersion is retained.

In specific examples of the invention, this cancellation of simple linear dispersion and retention of the transformed part of the dispersion results in a much greater tolerance of displacement of the input or output waveguides in a direction orthogonal to both the direction of dispersion and to the optical axis as compared to the conventional arrangement. In these examples of the invention, the added intervening transformation step causes the resulting wavelengths which are outputted from the third stage to remain coplanar with the input waveguide despite any displacement of the input waveguide in a direction orthogonal to both the direction of dispersion and the optical axis.

BRIEF DESCRIPTION OF THE DRAWINGS

FIGS. 2a and 2b show the alignment of the input and output waveguides in the conventional multiplexer before and after the input waveguide is moved in a direction orthogonal to the direction of dispersion.

FIG. 2c is the same view as FIG. 2b with the position of the input waveguide displaced in a direction orthogonal to both the direction of dispersion and the optical axis and with the position of the output waveguides displaced appropriately to match the new position of the input waveguides.

DETAILED DESCRIPTION OF THE INVENTION

Figure 3A:
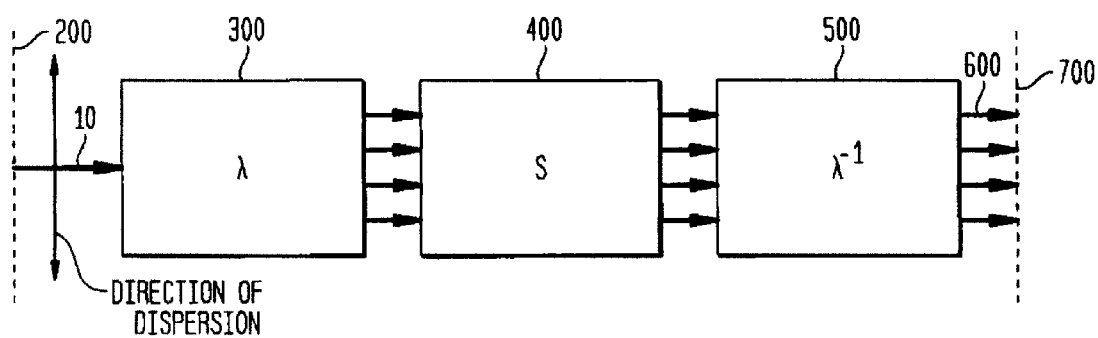
FIGS. 3a and 3b show a block diagram of a first embodiment of the invention.

A first illustrative embodiment of the invention is shown in FIG. 3a in block diagram form in three discrete stages: an input signal 100 of multiple wavelengths passes through an input plane 200 to enter the first stage 300 where the input signal is laterally dispersed to produce a distribution of signals of different wavelengths from each multiple wavelength source point, which distribution is approximately linear or evenly spaced. A multiple wavelength source point is a point source, such as an optical fiber or waveguide that has multiple signals of different wavelengths of light emerging from it. It will simplify the discussion if these signals of different wavelengths are sometimes described as different wavelengths. Also, lateral dispersion refers to the situation in which wavelengths travel along substantially parallel paths, but are separated by some distance.

These wavelengths then enter the second stage 400 which transforms the lateral positions of these wavelengths. The transformed wavelengths then enter the third stage 500 where the inverse dispersion operation of stage 300 is performed.

Figure 3B:
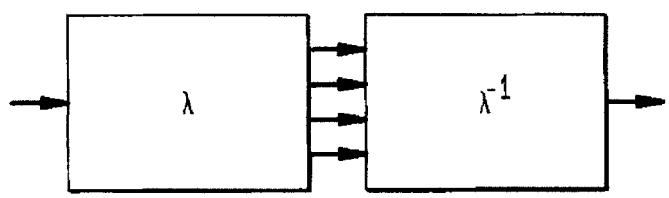

The inverse dispersion of stage 500 is the mirror image dispersion of stage 300 such that if stage 500 were placed immediately following stage 300, as shown in FIG. 3b, stage 500 would nullify the dispersion performed in stage 300. However, adding the intervening transformation stage 400 between the first and third stage results in only the simple linear dispersion of stage 300 being canceled in the system while the transformed part of the dispersion is retained.

Figure 4:
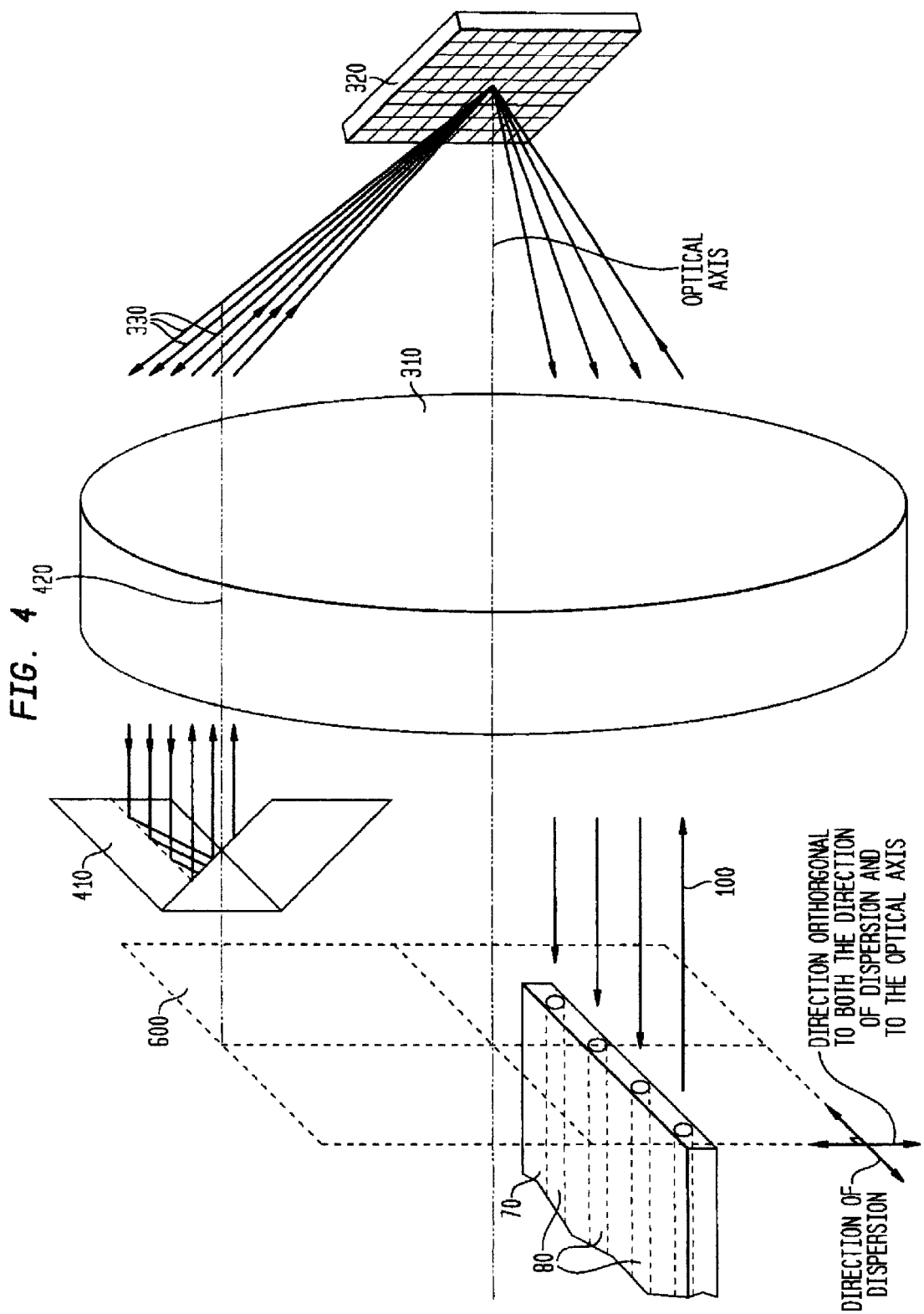
FIG. 4 shows an example of the first embodiment of the present invention.

FIG. 4 presents an example of this embodiment of the invention using actual optical components. An input waveguide 10 introduces a light signal 100 carrying multiple signals of different wavelengths. Light signal 100 is collimated by a first pass through the lens 310. The light then strikes a planar diffraction grating 320 at the back focal plane which angularly disperses the separate wavelength signals and reflects them. Angular dispersion refers to the situation in which wavelengths begin from a single point, but travel along diverging paths. Each wavelength signal thus leaves the grating 320 at a distinct angle. The separated light signals 330 are imaged by a second pass through lens 310 which also converts the angular dispersion of the wavelengths to lateral dispersion. In the system of FIG. 4, the first stage of the invention is composed of the first pass through lens 310, the first pass through grating 320, and the second pass through lens 310.

The separated wavelength signals then enter the second stage of the invention which is provided by a device 410 which transforms the lateral positions of these signals by inverting these lateral positions with respect to an axis 420 which is parallel to the optical axis of the system. Following the transformation, device 410 reflects the separated wavelength signals.

In this example, transformation device 410 is shown as aright-angled reflector placed such that its vertex is at or close to output plane 600 and with its vertex perpendicular to the direction of the dispersion. An axis 420 bisects the right angle of the reflector and is also parallel to the optical axis. The lateral positions of the separate wavelength signals are transformed by inverting them with respect to axis 420. Although device 410 is shown here as a right-angled reflector, it may also be a roof type prism or any other device or combination of devices which (1) inverts the lateral positions of the separate wavelength signals with respect to an axis which is parallel to the optical axis and (2) reflects the signals.

Following the transformation and reflection by device 410 of the second stage, the separated wavelength signals are collimated by lens 310 a third time. The signals then strike diffraction grating 320 and are dispersed a second time and reflected. Because of the transformation performed by device 410 of the second stage, this second grating pass doubles the dispersion of the separated wavelength signals as compared to the dispersion achieved by a single grating pass as in the conventional arrangement. As described in FIG. 3b, without such transformation, for instance if device 410 had been a simple mirror, the original dispersion of the separated wavelength signals performed in the first stage would be canceled upon striking the diffraction grating a second time. However, the transformation performed in this invention causes the signals, after passing through lens 310 a fourth time, to be imaged onto output plane 600 such that the optical focal points of all the signals remain coplanar with the input waveguide regardless of any displacement of the input waveguide in a direction orthogonal to both the direction of dispersion and the optical axis. Since the opening of the input waveguide is also on the output plane 600, the input waveguide and optical focal points are also collinear. The third stage of the invention here is composed of the third pass through lens 310, the second pass through grating 320, and the fourth pass through lens 310.

Figure 5A:
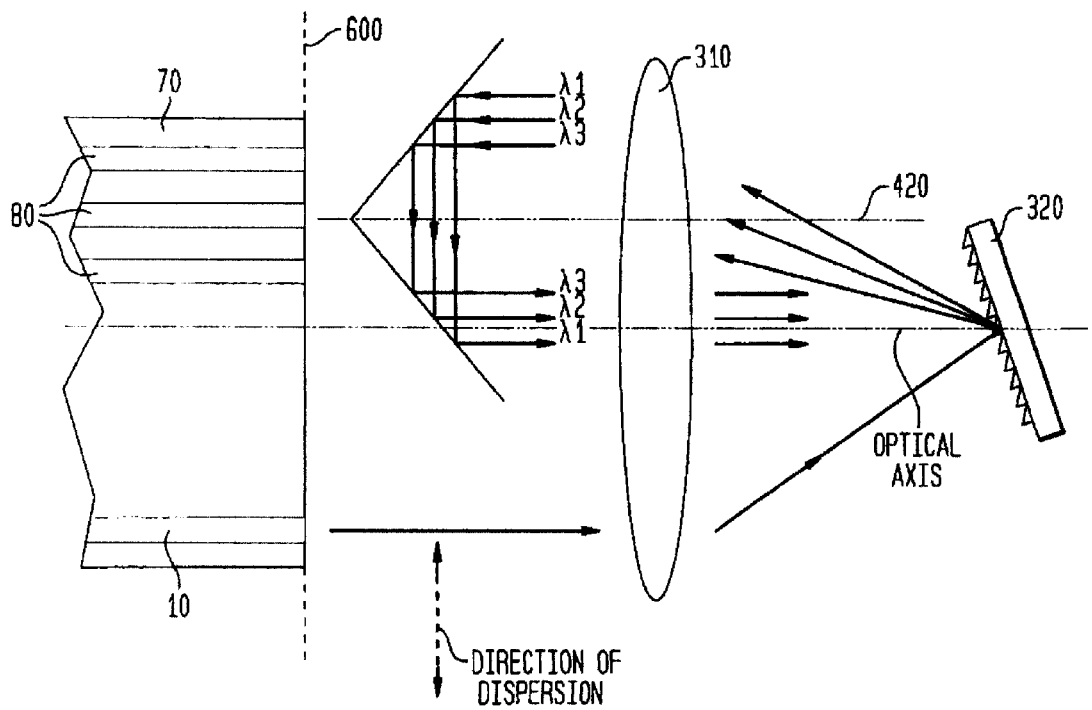
FIGS. 5a and 5b provide an overhead view of the example of the present invention.
Figure 5B:
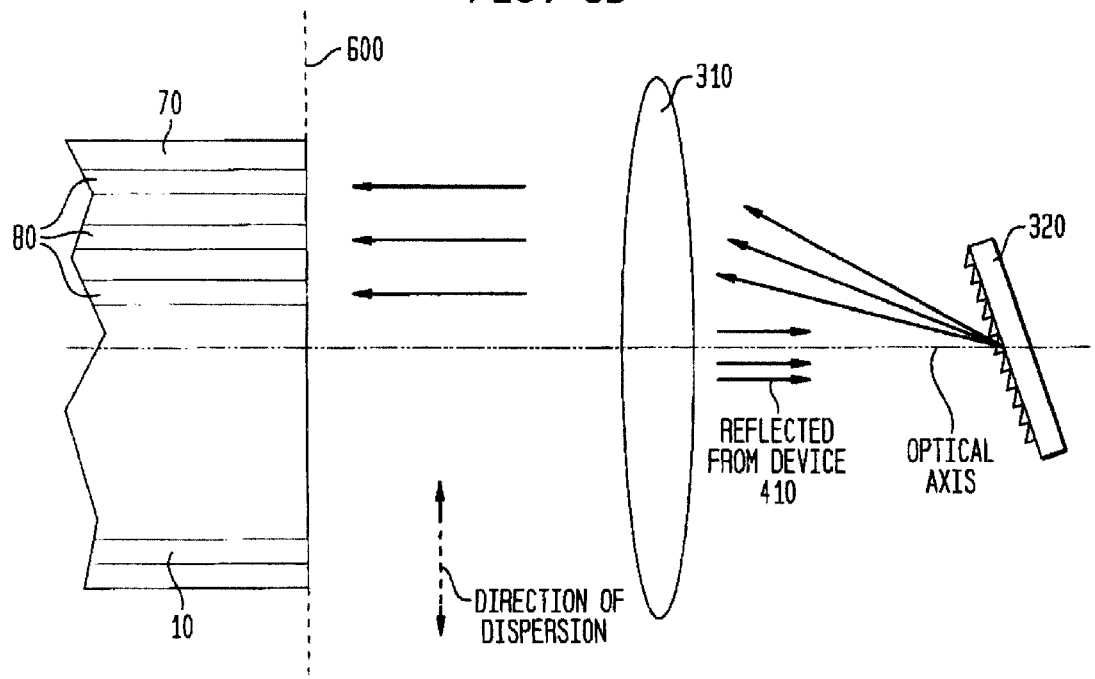

FIGS. 5a and 5b provide an overhead view of the system of FIG. 4. FIG. 5a depicts the signal of multiple wavelengths entering from input waveguide 10, passing through lens 310, being dispersed into separate signals of different wavelengths and reflected by diffraction grating 320, passing through lens 310 again, and the separate signals of different wavelengths being transformed by device 410. FIG. 5b shows these separate signals passing through lens 310 a third time, being dispersed and reflected again by diffraction grating 320, and passing through lens 310 a fourth time before entering the output waveguides.

Figure 6:
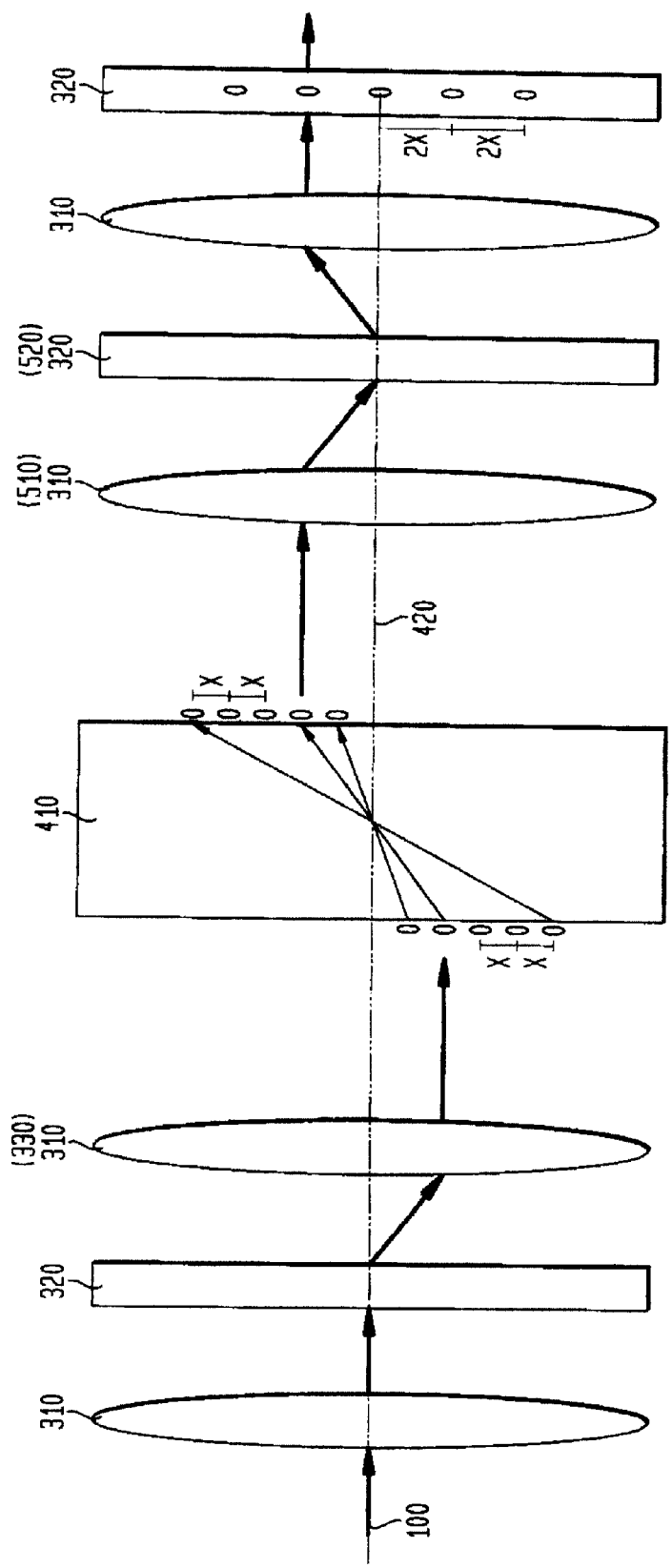
FIG. 6 shows an unfolded view of the example of the first embodiment of the present invention and also shows an overhead view of a non-reflective example of the first embodiment of the present invention.

FIG. 6 provides an unfolded view of the system of FIG. 4. A light signal 100 containing multiple wavelengths is collimated by lens 310 and dispersed and reflected by diffraction grating 320. Although the multiple wavelengths are separated into separate signals by diffraction grating 320, only one wavelength signal is shown to simplify the illustration. All the separated wavelength signals are then collimated by lens 310 before entering device 410. Device 410 then inverts the field position of each wavelength about an axis 420 which is parallel to the optical axis. However, to simplify the illustration, only three inversions and one output from device 410 are shown. Each separated wavelength signal is then collimated by lens 310, dispersed and reflected by diffraction grating 320, and collimated again by lens 310 before being received at output waveguides in linear array 70. Also, FIG. 6 shows the final dispersion at the output waveguides (2X) is twice the lateral spacing of the original dispersion (X).

Figure 7A:
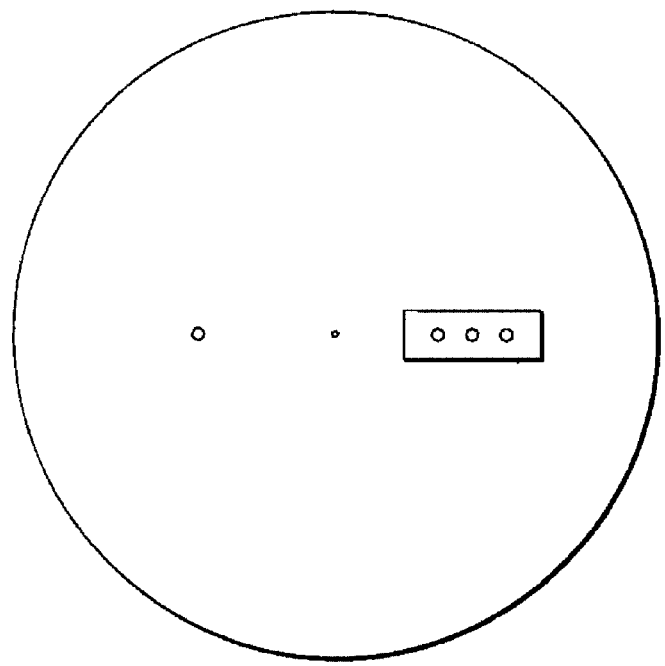
FIGS. 7a and 7b show the effect of the transformation on the alignment tolerance of the present invention.
Figure 7B:
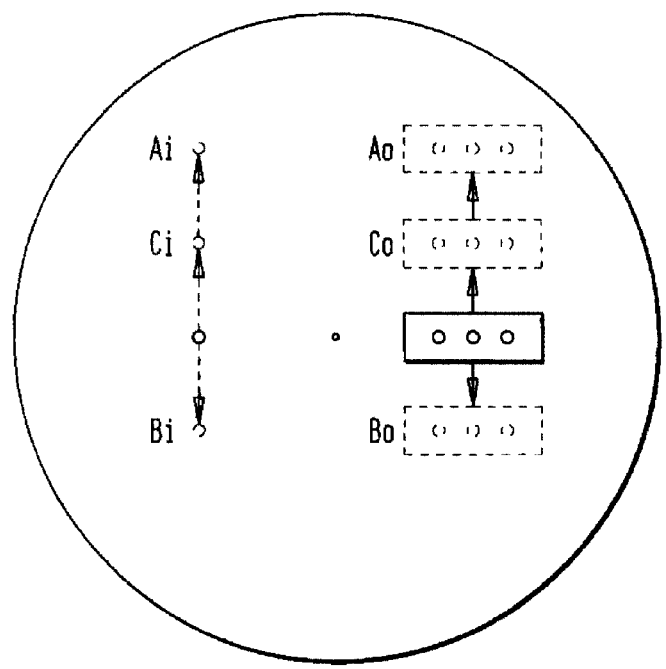

The effect of the transformation on the alignment tolerance of the system is shown in FIGS. 7a and 7b. FIG. 7a shows the input and output waveguides in an initial position. FIG. 7b shows the input waveguide displaced in a direction orthogonal to the direction of dispersion to three different positions $A_i$, $B_i$, and $C_i$ and the output waveguides displaced to corresponding positions $A_o$, $B_o$, and $C_o$ so as to allow them to continue to receive the separated light signals which originated from the input. Unlike the conventional multiplexer arrangement, where the output waveguides must be displaced in a direction opposite to the direction of displacement of the input waveguide for the output waveguides to continue to receive the separated light signals which originated from the input, in the present invention the output waveguides are displaced by the same amount in the same direction as the displacement of the input waveguide for the outputs to continue to receive signals originating from the input. Therefore, in this example of the first embodiment of the present invention, the input and output waveguides always remain coplanar (and collinear where the input and output planes are the same) regardless of any displacement of the input.

It should be noted here that although the system of FIG. 4 by means of reflection is able to reuse the same components for the first stage as are used for the third stage, this need not be so. This can be seen in reference to FIG. 6. Where reflection is employed to reuse components, then FIG. 6 shows an unfolded view of the system. However, where no reflection is used, then FIG. 6, employing the reference numerals in parenthesis, depicts another non-reflecting example of the first embodiment of the invention.

In the non-reflective depiction of FIG. 6, an input signal 100 enters the first stage. Here the first stage is composed of a lens 310, a diffraction grating 320, and a second lens 330 which is identical to lens 310. Input signal 100 is collimated by lens 310, dispersed by grating 320, and the separated wavelengths are imaged by lens 330. The separated wavelengths then enter the second stage, composed of device 410, which could be a prism, which transforms the wavelengths by inverting the lateral positions of the wavelengths about an axis 420 which is parallel to the optical axis of the system. The transformed wavelengths then enter the third stage which is composed of a third lens 510, which is identical to lens 310, a second diffraction grating 520, which is identical to grating 320, and a fourth lens 530, which is identical to lens 310. Each separated wavelength signal is then collimated by lens 510, dispersed by grating 520, and imaged by lens 530 before being received at output waveguides in linear array 70. This non-reflective example achieves the same double dispersion at the output plane and coplanar relationship between the input and outputs which was achieved in the reflective example of FIG. 4.

Figure 8:
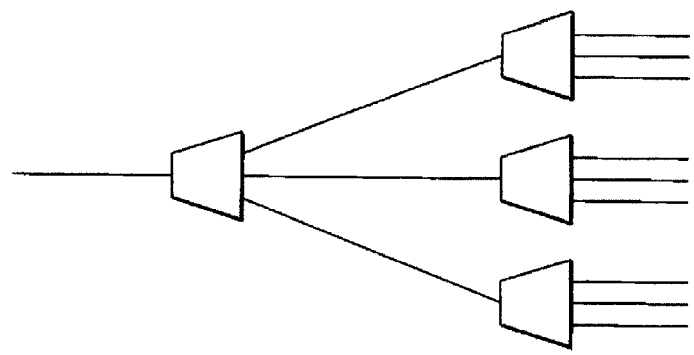
FIG. 8 provides a generic view of hierarchical demultiplexing.

Another example of the first embodiment of the present invention involves using the transformation device to provide for hierarchical comb demultiplexing. The demultiplexing heretofore described has involved only a single demultiplexing step. Hierarchical demultiplexing involves the demultiplexing of a signal of multiple wavelengths over two or more discrete stages, as shown in FIG. 8.

Hierarchical demultiplexing becomes increasingly attractive as the number of channels carried on a single fiber increases to more than 100. Demultiplexing by stages allows the demultiplexing function to be spread over multiple physical locations. This provides an attractive way to handle large channel count systems where access to individual channels is not always required. Therefore, in a central office environment, the situation where very large numbers of fiber are routed into a single shelf can be avoided. Also, where fiber is to be routed directly to residential areas, some of the channels can be routed to a local neighborhood without requiring that all channels be demultiplexed at the same location.

Figure 9A:
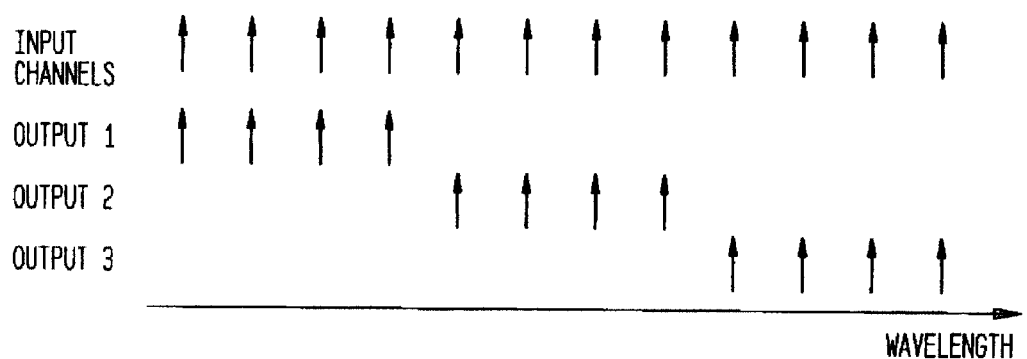
FIG. 9a shows hierarchical demultiplexing using continuous blocks of wavelengths and FIG. 9b shows hierarchical demultiplexing using combs of wavelengths.
Figure 9B:
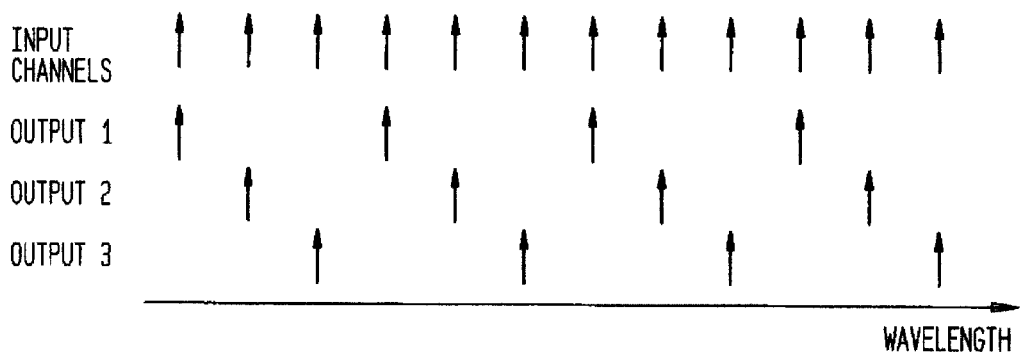

Hierarchical demultiplexing can be accomplished by separating the channels either as continuous blocks of adjacent wavelengths, for example with channels 1–4 in the first fiber, channels 5–8 in the second fiber, and so on as shown in FIG. 9a, or using a comb, for example with channels 1, 4, 9, and 13 in the first fiber, channels 2, 5, 10, and 14 in the second fiber, and so on as shown in FIG. 9b. Comb demultiplexing is preferable because it increases the wavelength separation of the demultiplexed channels within a group. For example if the initial channel spacing is 50 GHz, the next stage may have channels separated by 200 GHz. This increased channel spacing makes subsequent separation into separate channels easier with comb demultiplexing than with continuous group demultiplexing where the original channel spacing is maintained.

Figure 10:
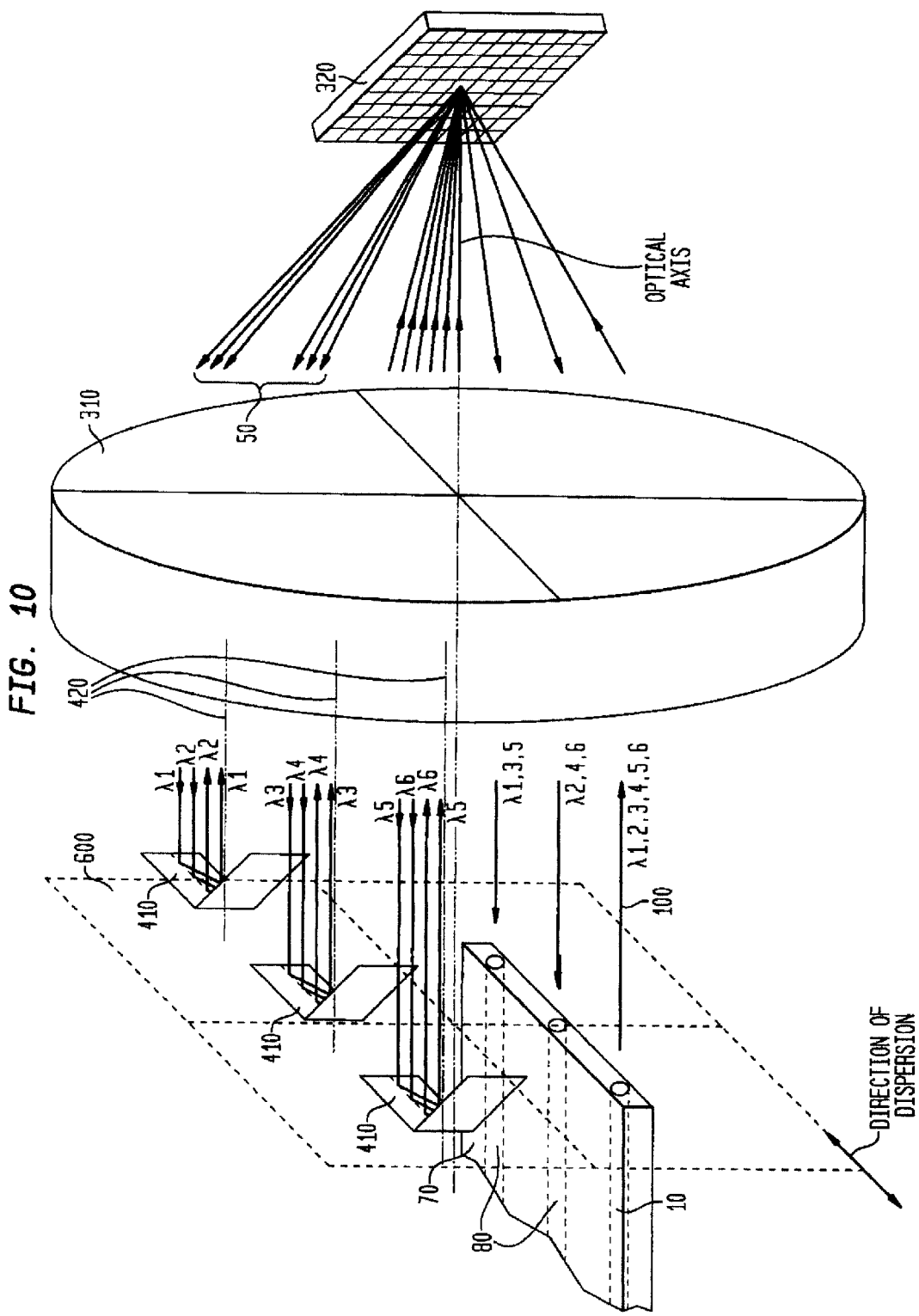
FIG. 10 provides a second example of the first embodiment of the present invention.

FIG. 10 shows another example of the first embodiment of the present invention which performs comb demultiplexing. The structure and function of this embodiment is similar to the embodiment shown in FIG. 4. A light signal 100 of multiple wavelengths enters from input waveguide 10, passes through lens 310, is dispersed and reflected by dispersion grating 320, and passes through lens 310 again. The first stage of the invention consists of the first pass through lens 310, the first pass through grating 320, and the second pass through lens 310.

The separated wavelengths then enter the second stage which consists of device 410. In the system of FIG. 4, device 410 inverted the lateral positions of all the separated wavelength signals with respect to a single axis. In this embodiment, inversion is performed with respect to multiple axes. Here, device 410 transforms the lateral positions of the separated wavelength signals by groups. The lateral positions of the signals in each group are inverted with respect to an axis 420 which is parallel to the optical axis.

To provide for comb demultiplexing, transformation device 410 in this embodiment is shown as an array of right-angled reflectors placed such that their vertices are at or close to output plane 600 and with their vertices perpendicular to the direction of the dispersion. Each reflector has an axis 420 which bisects the right angle of the reflector and is also parallel to the optical axis. The lateral positions of each group of separate wavelength signals are transformed by inverting each group with respect to one of axes 420. Although device 410 is shown here as an array of right-angled reflectors, it may also be an array of root prisms or any other device or combination of devices which (1) transforms the lateral positions of the separate wavelength signals by groups by inverting the lateral positions of each group of separate wavelength signals with respect to an axis which is parallel to the optical axis and (2) reflects the signals.

After leaving device 410 of the second stage, the separated wavelength signals pass through lens 310 a third time and are dispersed and reflected again by dispersion grating 320. This second grating pass has the effect of undoing the dispersion between the groups while doubling the dispersion within the groups. The separated signals are then focused by a fourth pass through lens 310 onto the output waveguides. As in the example of FIG. 4, the transformation step here causes the signals to be imaged onto output plane 600 such that the optical focal points of all the signals remain coplanar with the input waveguide regardless of any displacement of the input waveguide in a direction orthogonal to both the direction of dispersion and the optical axis. The third stage of the invention consists of the third pass through lens 310, the second pass through grating 320, and the fourth pass through lens 310.

Figure 11:
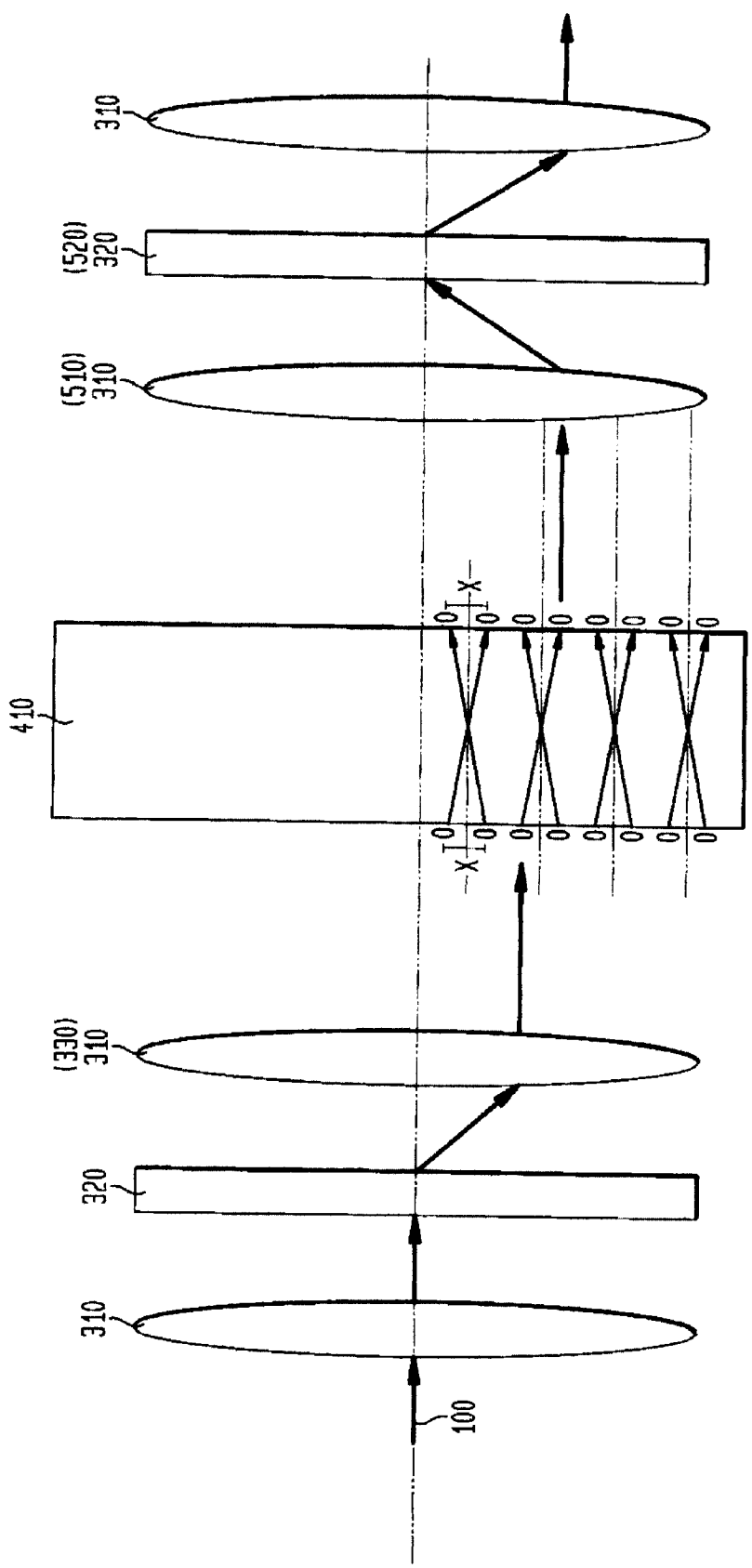
FIG. 11 provides an unfolded view of the second example of the first embodiment of the present invention and also provides an overhead view of a non-reflective example of the first embodiment of the present invention.

FIG. 11 shows an unfolded view of the hierarchical comb demultiplexing example. A light signal of multiple wavelengths enters the system and is collimated by lens 310 and dispersed and reflected by diffraction grating 320. Although the multiple wavelengths are separated into separate signals by diffraction grating 320, only one wavelength signal is shown to simplify the illustration. All the separated wavelength signals are then collimated by lens 310 before entering device 410. Device 410 then acts upon the separated wavelength signals in groups by inverting the lateral positions of each group of signals about an axis 420. Although all the separated wavelength signals are transformed, and reflected by device 410, only one is shown exiting the device to simplify the illustration. All the transformed, reflected signals are then collimated by lens 310, dispersed and reflected by diffraction grating 320, and collimated by lens 310 before reaching the output waveguides. FIG. 11 also shows the final double dispersion, with "wrap around".

"Wrap around" here refers to the fact that multiple wavelengths are captured by one output waveguide and that the several wavelengths are captured in a "wrap around" fashion. FIG. 11 shows several wavelengths being captured by each output waveguide. The "wrap around" fashion of the capturing can be seen more clearly in reference to FIG. 10. In FIG. 10, $\lambda_1$, is captured by the first output waveguide and $\lambda_2$ is captured by the next output waveguide. $\lambda_3$ is then "wrapped around" such that it is captured again by the first output waveguide and $\lambda_4$ is "wrapped around" such that it is captured by the second output waveguide, and so forth with the remaining wavelengths.

As with FIG. 6, FIG. 11, employing the reference numerals in parentheses, depicts a non-reflective example of the system of FIG. 10. The first stage is composed of a first lens 310, a diffraction grating 320, and a second lens 330. The second stage contains device 410 which can be composed of an array of prisms where an axis 420, parallel to the optical axis, goes through each prism and where each prism inverts the lateral positions of one group of wavelengths about the prism's corresponding axis 420. The third stage is composed of a third lens 510, which is identical to lens 310, a second diffraction grating 520, which is identical to grating 320, and a fourth lens 530, which is identical to lens 310. This non-reflective example achieves the same double dispersion with wrap around at the output plane and coplanar relationship between the input and outputs which was achieved in the reflective example of FIG. 10.

Figure 12A:
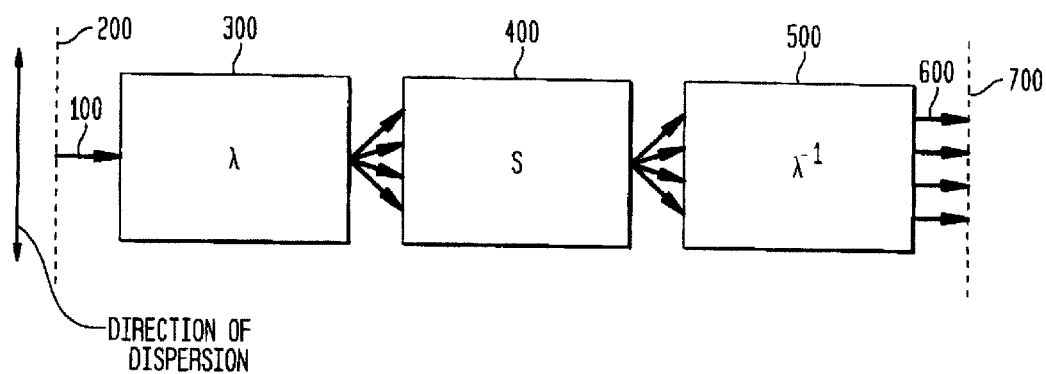
FIGS. 12a and 12b show a block diagram of a second embodiment of the invention.

Another embodiment of the present invention is shown in FIG. 12a. A block diagram is used to show the three discrete stages of the invention. An input signal 100 of multiple wavelengths passes through an input plane 200 and enters the system. The first stage 300 angularly disperses the input signal to produce a distribution of wavelengths from each multiple wavelength source point which is approximately linear or evenly spaced. These wavelengths then enter the second stage 400 which transforms the angular positions of these wavelengths. The transformed wavelengths then enter the third stage 500 where the inverse dispersion operation of stage 300 is performed.

Figure 12B:
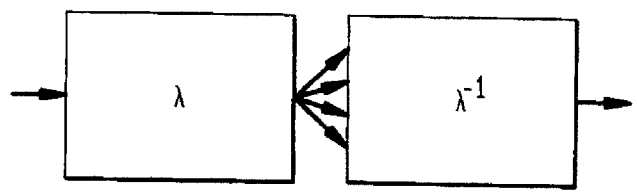

As with the previous embodiment, the inverse dispersion of 500 is the mirror image dispersion of stage 300 such that if stage 500 were placed immediately following stage 300, as shown in FIG. 12b, stage 500 would nullify the dispersion performed in stage 300. However, because of the intervening transformation step, the result achieved by the dispersion operation of stage 500 is to focus the output wavelengths 600 on an output plane 700 which is parallel to input plane 100 such that the simple linear dispersion of stage 300 is canceled in the system, but the transformed part of the dispersion is retained.

FIGS. 4 and 10 present examples of this embodiment using actual optical components. The systems depicted in those figures operate exactly as previously explained, but for purposes of this embodiment the optical components are grouped together into different stages. In this embodiment, the first stage 300 is composed of the first pass through lens 310 and the first pass through diffraction grating 320. As before, grating 320 angularly disperses the separate wavelengths and reflects them.

These angularly dispersed wavelengths then enter the second stage 400 which is composed of the second pass through lens 310, device 410, and the third pass through lens 310. This second stage then transforms the wavelengths by inverting the angular positions of the separated wavelengths with respect to a single axis 420 or multiple axes 420 depending on whether hierarchical demultiplexing is being employed. The transformed wavelengths then enter the third stage which is composed of the second pass through grating 320 and the fourth pass through lens 310.

Again, non-reflective examples exist as well, as explained previously with reference to FIGS. 6 and 11. As before, rather than reusing components by means of reflection, no reflection is employed and four identical lenses and two identical diffraction gratings are used.

Figure 13A:
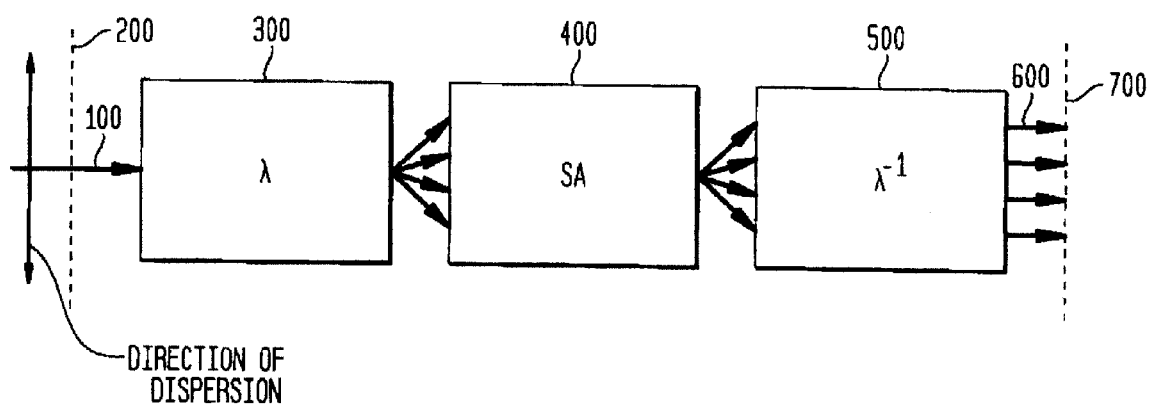
FIGS. 13a and 13b show a block diagram of a third embodiment of the invention.

Another embodiment of the invention is shown in FIG. 13a. A block diagram is used to show the three discrete stages of the invention. An input signal 100 of multiple wavelengths passes through an input plane 200 and enters the system. The first stage 300 laterally and angularly disperses the input signal to produce a distribution of wavelengths from each multiple wavelength source point which is approximately linear or evenly spaced. These wavelengths then enter the second stage 400 which transforms both the lateral and angular positions of these wavelengths. The transformed wavelengths then enter the third stage 500 where the inverse dispersion operation of stage 300 is performed.

Figure 13B:
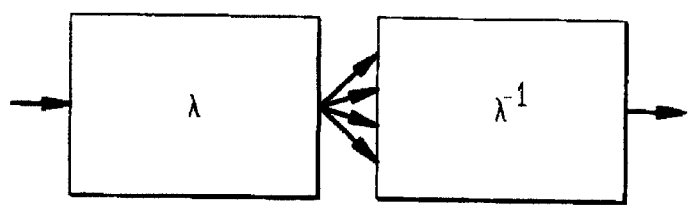

As with the previous embodiments, the inverse dispersion of 500 is the mirror image dispersion of stage 300 such that if stage 500 were placed immediately following stage 300, as shown in FIG. 13b, stage 500 would nullify the dispersion performed in stage 300. However, because of the intervening transformation step, the result achieved by the dispersion operation of stage 500 is to focus the output wavelengths 600 on an output plane 700 which is parallel to input plane 100 such that the simple linear dispersion of stage 300 is canceled in the system, but the transformed part of the dispersion is retained.

Figure 14:
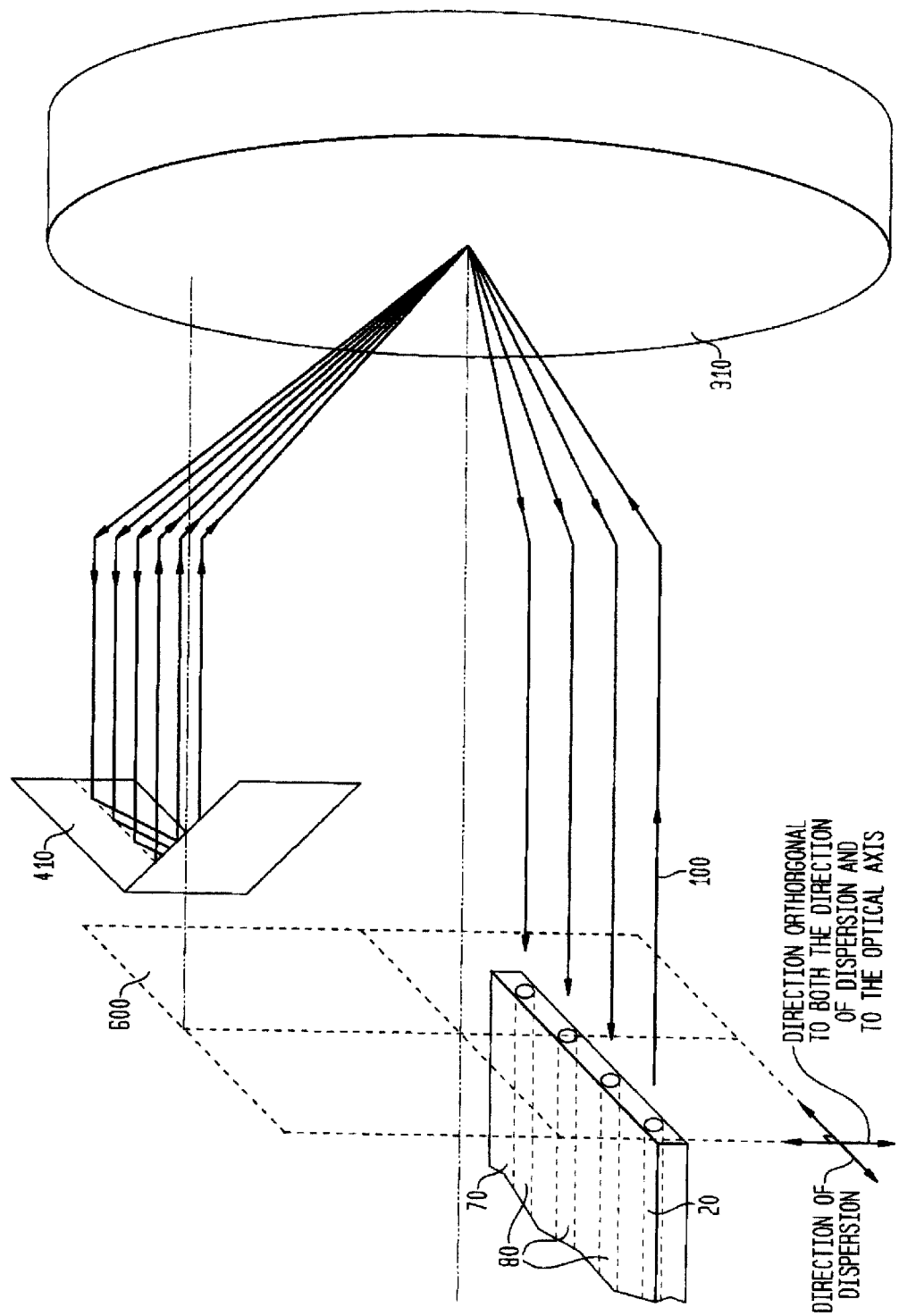
FIG. 14 shows a first example of the third embodiment of the invention.
Figure 15:
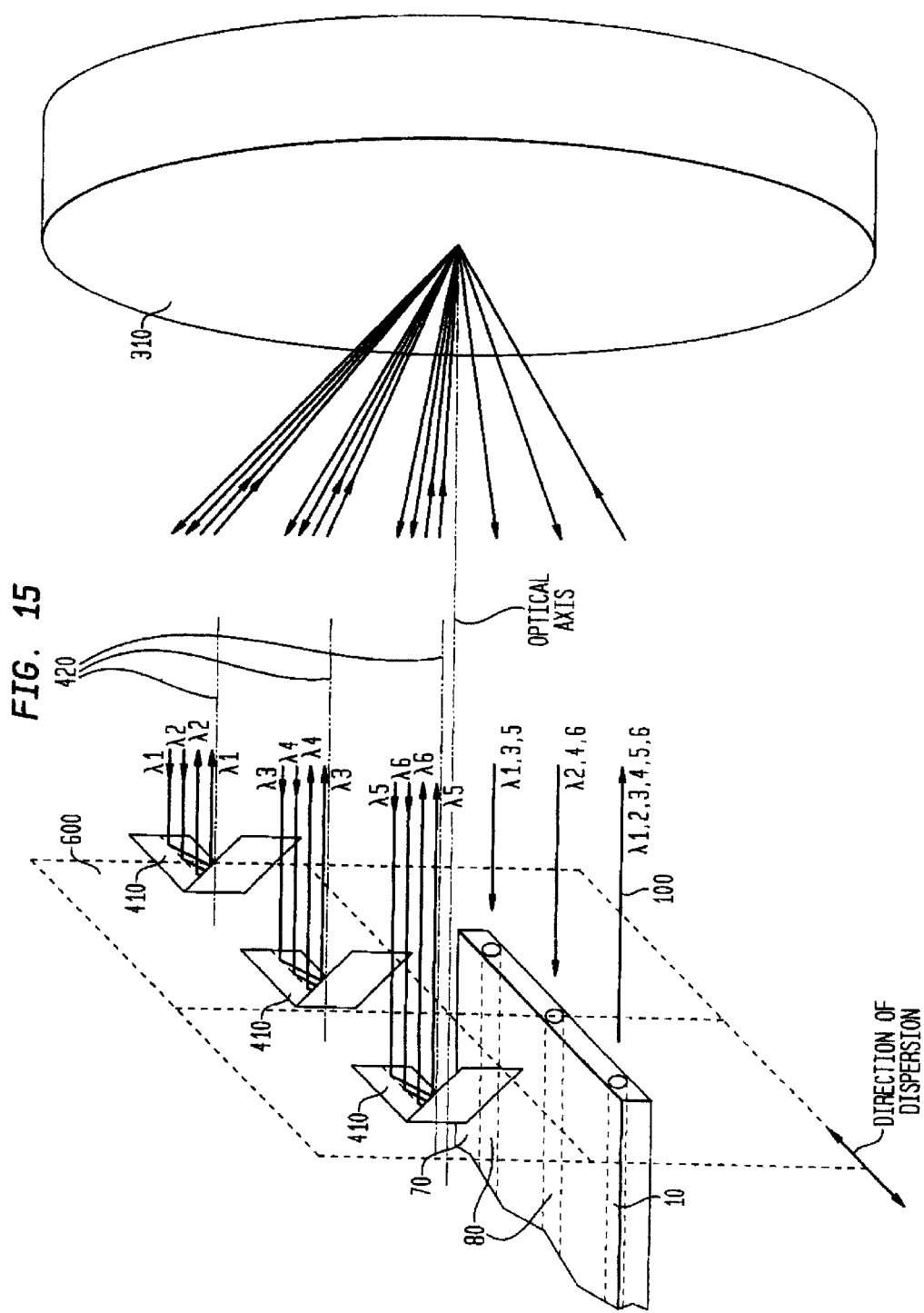
FIG. 15 shows a second example of the third embodiment of the invention.

FIGS. 14 and 15 show examples of this embodiment using actual optical components. These example systems operate similarly to the systems in FIGS. 4 and 10 except that the lens and diffraction grating of the previous systems is replaced by a single curved grating in the systems of FIGS. 14 and 15. Input signal 100 enters each system through input waveguide 10. The first stage of the invention, composed of curved diffraction grating 310, then laterally and angularly disperses the separate wavelengths contained in 100 and reflects them. The second stage of the invention, composed of device 410, then transforms the wavelengths by inverting both the lateral and angular positions of the separated wavelengths with respect to one axis 420, as in the system of FIG. 14, or several axes 420 if hierarchical demultiplexing is being performed, as in the system of FIG. 15. Device 410 then reflects the transformed wavelengths so that they enter the third stage of the invention which is composed of a second pass through curved diffraction grating 310. This third stage of the invention, consisting of curved grating 310, then performs a dispersion operation which is inverse to that performed in the first stage such that if this third stage were performed immediately following the first stage, for instance of device 410 were simply a mirror, the dispersion of the first stage would be canceled by the third stage. However, this transformation step added between the first and third stages causes the signals, after being dispersed and reflected by curved diffraction grating 310 a second time, to be imaged onto output plane 600 such that the optical focal points of all the signals remain coplanar with the input waveguide regardless of any displacement of the input waveguide in a direction orthogonal to both the direction of dispersion and the optical axis.

In addition, as with the other examples, these examples of this third embodiment need not employ reflection. As before, rather than reusing components by means of reflection, these non-reflective examples can simply employ two identical devices which perform both lateral and angular dispersion rather than employing reflection to reuse the same device.

Figure 1:
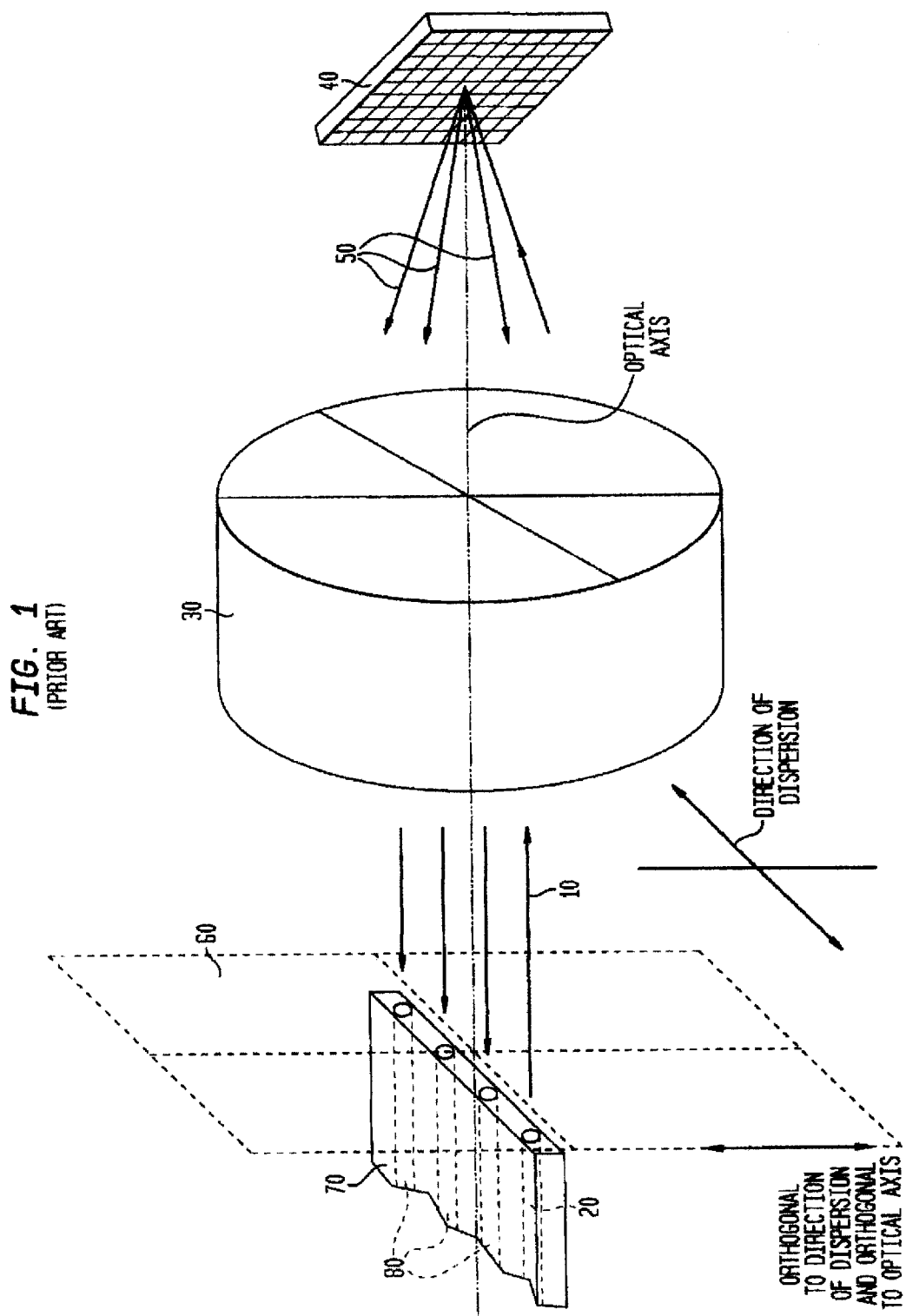
FIG. 1 shows a conventional, free-space wavelength multiplexer.
Figure 2A:
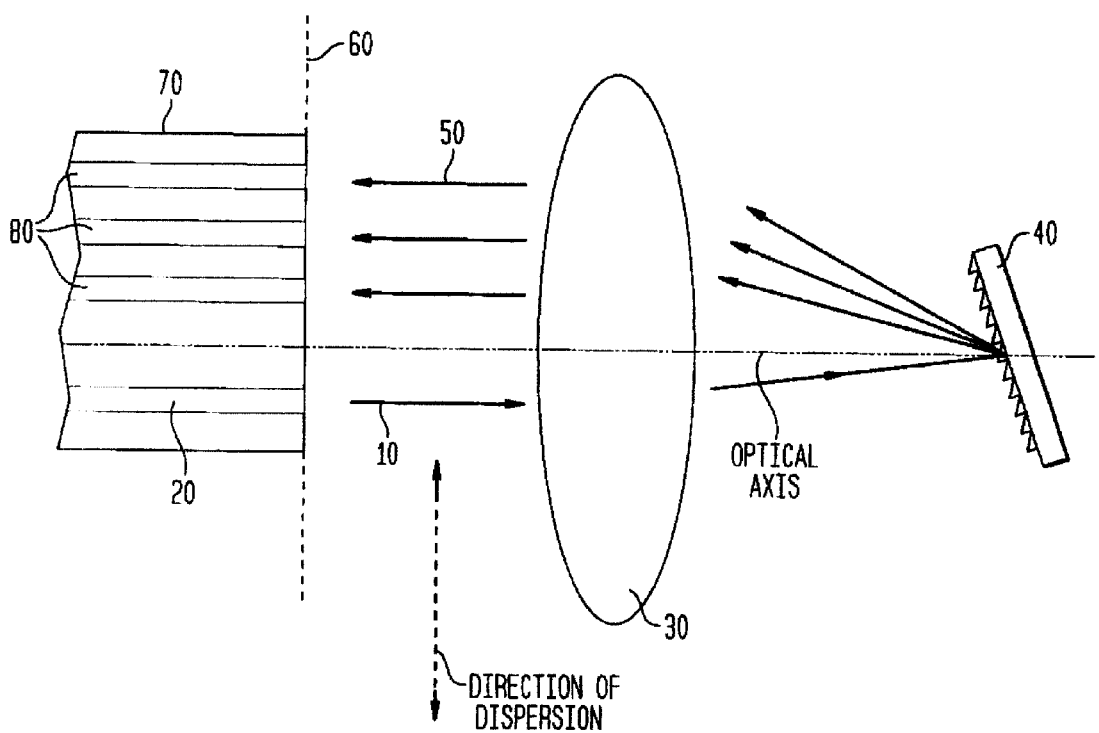

The wavelength multiplexing arrangement of the several examples of the present invention has several advantages over the conventional arrangement of FIG. 1. First, unlike the conventional arrangement, which requires that the output be realigned with the input whenever the input is displaced in a direction orthogonal to both the direction of dispersion and to the optical axis, the output of these examples of the present invention remains aligned with the input in spite of any displacement of the input. Consequently, displacement of the input caused by mechanical or thermal effects, which cause misalignment in the conventional arrangement resulting in degraded system performance, has no effect on these examples the present invention since the input and output always remain coplanar (and collinear where the input and output planes are the same).

A further benefit to the automatic alignment between the input and output of these examples of the present invention is the ease in which multiple input/output combinations may be fashioned. Where multiple WDM input fibers are to be used with a single multiplexer simultaneously, they must be stacked vertically, i.e., in a direction orthogonal to both the direction of dispersion and to the optical axis. Thus, with the conventional multiplexer, each output array must be aligned to match the displacement of its corresponding input waveguide. This requires a cumbersome two dimensional array with registration between all the fibers. However, because the input and corresponding outputs of these examples of the present invention remain collinear regardless of displacement, a simple stacked arrangement of linear arrays of fibers or waveguides may be used in the reflective examples of the present invention to accommodate multiple WDM input fibers. Thus, the reflective examples of the present invention obviate any need for two dimensional registration between the fibers.

Figure 16:
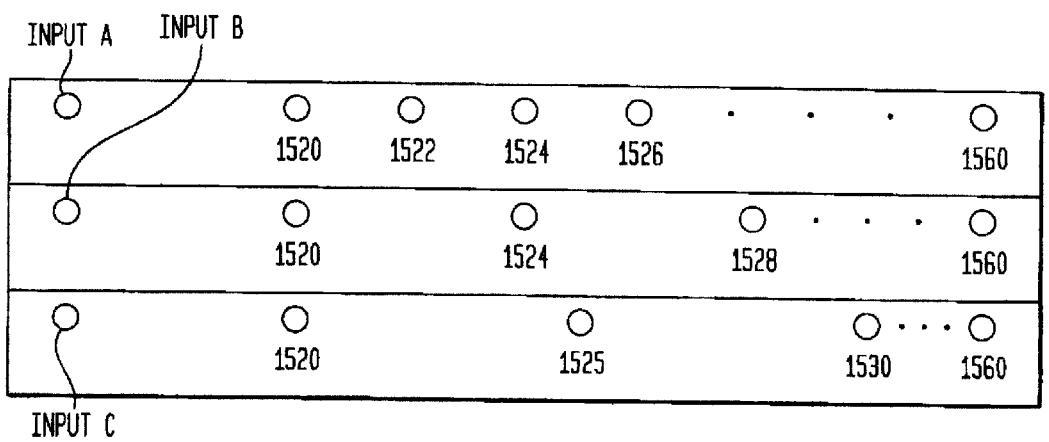
FIG. 16 shows a frontal view of the stacked, linear arrays used for multiple inputs in the present invention.

FIG. 16 shows a frontal view of the stacked, linear arrays used for multiple inputs in the present invention. Three inputs A, B, and C are shown in FIG. 16, but the number of inputs may vary. Also, all the individual wavelengths must be in the same wavelength band. This is because the physical dimensions of the field of view of the lens and the grating period establish a maximum wavelength band which the lens and grating can accommodate. All wavelengths which are inputted to this lens and grating system must come within this maximum wavelength band. For example, in FIG. 16 the separated wavelengths corresponding to each input all fall within the same wavelength band of 1520 to 1560 nm (again, this wavelength band is used as an example and the invention is not limited to this band). However, the outputs of the arrays do not need to be aligned. This means that the individual wavelengths do not need to be identical between the arrays. Thus, as shown in FIG. 16, the outputs corresponding to inputs A, B, and C are not necessarily aligned.

Figure 17:
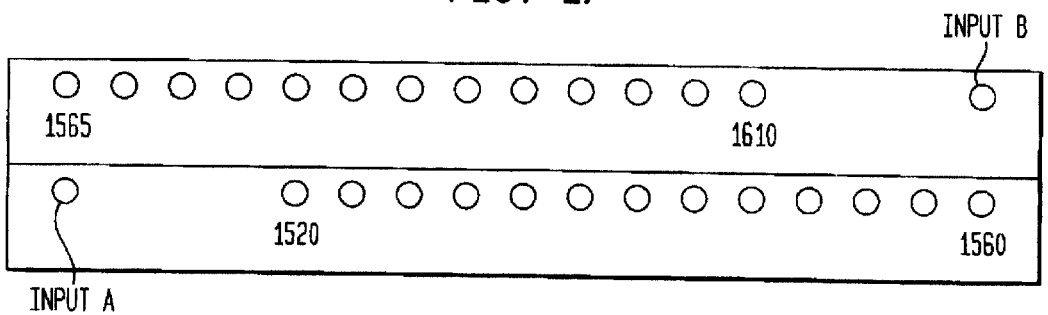
FIG. 17 provides a frontal view of two stacked, linear arrays with input signals containing wavelengths within two distinct wavelength bands.

A further advantageous embodiment of the present invention allows multiple wavelength bands to be used in a single multiplexer system by displacing the position of the multiple inputs along the direction of dispersion and introducing signals containing wavelengths of distinct wavelength bands from the separate inputs. FIG. 17 provides a frontal view of two stacked, linear arrays with input signals containing wavelengths within two distinct wavelength bands. Input A carries a multiple wavelength signal with wavelengths in the band of 1520 to 1560 nm. By placing Input B at the other end of the linear array, the system is able to accommodate another separate wavelength band, here 1565 to 1610 nm. With the inputs placed at the opposite ends of the stacked, linear arrays, for example the positions of Inputs A and B as shown in FIG. 17, the maximum combined wavelength band is achieved. An input can be placed anywhere in between these maximum positions to accommodate a distinct wavelength band, but this band will only be a sub-band within the maximum band achieved by placing the input at the far ends.

Other benefits of the present invention include the opportunity to either reduce the size of the system or increase the efficiency of the system. These opportunities are created from the increased dispersion of the present invention compared with the conventional arrangement. The increased dispersion allows for either a shorter focal length lens to be used or an increased grating period. A smaller focal length lens allows for a more compact system. Reducing the size of the lens will lessen misalignment effects due to mechanical stress or temperature variations. Alternatively, increasing the grating period can result in higher efficiency for the system.

Another benefit achieved by the present invention is the ease with which the linear dispersion of the lens and grating system can be matched to the output waveguides as compared with the conventional multiplexer arrangement. As with any actual system employing a lens and grating combination to separate wavelengths, the dispersion of the lens and grating combination must be matched to the output waveguides to ensure that the correct wavelength is coupled to the correct output waveguide.

In the conventional arrangement, this matching is achieved by changing the focal length of the lens. This procedure is undesirable because it tightens the tolerances on the lens component of the system.

However, in the present invention, one merely needs to rotate the transformation device an angle $\theta_1$ about an axis parallel to the optical axis and also rotate the input and output waveguides an angle $\theta_2$ in the same direction until the linear dispersion of the lens and grating system is matched to the output waveguides. For small angles where $\theta_{1,2}<5$ degrees, $\theta_1 \approx \theta_2$. Where $\theta_1$ is $>5°$, $\theta_2$ deviates such that it is within $\pm 5°$ of $\theta_1$ but $\theta_2$ is no longer approximately equal to $\theta_1$. Additional calculations are required to determine $\theta_2$ where $\theta_1$ is $>5°$.

Where the transformation device consists of an array of devices, such as the array of right-angled reflectors shown in FIG. 10, each device of the array is rotated an angle $\theta_1$ about an axis orthogonal to the direction of dispersion. Thus, each reflector of FIG. 10 would be rotated an angle $\theta_1$ about each respective axis 420 and the input and output waveguides would be rotated an angle $\theta_2$.

It should be noted that rotating the transformation device also affects the amount of final dispersion obtained. A zero to ninety degree rotation of the spatial transformation device results in from zero to double the dispersion achieved by a single pass of the diffraction grating.

Another advantage achieved by the present invention is the opportunity to reduce polarization dependent loss, or "PDL", between the grating passes. PDL refers to the difference in the amount of loss in a light wave signal which is solely dependent upon the different polarizations of the light. Like all electromagnetic radiation, a light wave has electrical components which vibrate at right angles to the direction of travel. The direction of these right angle vibrations is referred to as the polarization of the light wave. When a light wave strikes a diffraction grating which has a grating period size near the size of the wavelength of the light wave, the light wave will experience a loss the amount of which depends solely on the light wave's polarization. Thus, this PDL will occur whenever a diffraction grating is employed in which the grating period size is near the size of the wavelengths striking the grating.

The present invention minimizes this PDL by placing a device 430 in front of device 410 which rotates the polarization of the light wave between the two grating dispersions as shown in FIG. 18. Specifically, a quarter wave plate may be used as the polarization rotating device. It should be noted that although device 430 is shown in FIG. 18 with the basic system of FIG. 4, device 430 may be used in conjunction with any example of the present invention to minimize PDL as described above.

It should be noted that the optical systems of the present invention are not limited to the simple functions of demultiplexing but can also be used to enhance systems, which use dispersion to separate the wavelengths in order to perform other system functions such as equalization or add-drop. For example, a two wavelength band equalizer, such as might be required for the C and L band erbium amplifier, could be constructed using the configuration of FIG. 17. Such equalizers are discussed in detail in J. E. Ford and J. A. Walker, "*Dynamic Spectral Power Equalization Using Micro-Opto-Mechanics,*" in Photonics Technology Letters 10 (10), 1440–1442, October 1998, which is hereby incorporated by reference as if fully set forth herein. This system could be more compact than a conventional arrangement due to the doubling of the dispersion and the use of the two offset inputs. Also, it should be noted that the optical systems of the present invention are usable for single mode or multi-mode inputs and outputs. Finally, it should be noted that the comb demultiplexing example of the present invention can be used in conjunction with active transmit/reflect devices in front of the waveguides to make wavelength add-drops, which drop each comb of wavelengths as a group.

These are examples of a class of devices which use a dispersion stage followed by an image transformation stage and then a dispersion stage arranged to cancel the initial dispersion to provide demultiplexing functionality.

The foregoing merely illustrates the principles of the present invention. Those skilled in the art will be able to devise various modifications, which although not explicitly described or shown herein, embody the principles of the invention and are thus within its spirit and scope.

What is claimed is:

1. An apparatus for separating wavelengths by dispersion comprising:
    a) one or more input/output combinations, each of said combinations comprising:
        1) an input portion comprising an input waveguide having an opening through which a light signal containing multiple wavelengths is introduced; and
        2) an output portion comprising one or more output waveguides each of said output waveguides having an opening through which light signals of one or more wavelengths are received, and wherein for each of said input/output combinations said input waveguide opening and said output waveguide openings are collinear, and wherein for each of said input/output combinations said input waveguide opening and said output waveguides openings contact an output plane which is orthogonal to the direction of travel of said introduced light signals; and
    wherein said input waveguide openings and said output waveguide openings for all input/output combinations are all parallel to the direction of dispersion and are all parallel to each other; and
    b) a lens for collimating said introduced signals;
    c) a planar diffraction grating for dispersing said collimated, introduced signals and reflecting said dispersed signals so that said reflected, dispersed signals are imaged by said lens; and
    d) a device which
        1) spatially transforms the field positions of said multiple wavelengths of said imaged signals by inverting said field positions about one or more axes which are orthogonal to the direction of dispersion; and
        2) reflects said spatially transformed signals so that said reflected, spatially transformed signals are collimated a second time by said lens, then dispersed a second time and reflected by said diffraction grating, then imaged a second time by said lens so that each twice imaged signal creates an optical focal spot on one of said openings of said output waveguides.

2. The apparatus of claim 1 wherein said device is one or more right-angled reflectors whose vertices are at or near said output plane and whose vertices are perpendicular to the direction of dispersion and wherein the right angle of each said reflector is bisected by one of said axes of d)1).

3. The apparatus of claim 2, wherein all said input waveguide openings are collinear and wherein all said wavelengths of all said introduced light signals fall within a single wavelength band and wherein each said input/output combination has the same width.

4. The apparatus of claim 2, wherein each said input waveguide opening is displaced in a direction parallel to the direction of dispersion such that the wavelengths contained in each said introduced signal of a) lie within a separate band.

5. The apparatus of claim 2, further comprising a second device which
    (a) rotates the polarization of said imaged signals before said first device spatially transforms and reflects said imaged signals; and (b) rotates the polarization of said reflected, spatially transformed signals before they are collimated a second time by said lens so as to minimize the polarization dependent loss.

6. The apparatus of claim 5, wherein said second device is a quarter wave plate.

7. A method for separating wavelengths by dispersion comprising the steps of:
   a) introducing one or more light signals each containing multiple wavelengths using one or more input waveguides wherein each signal is introduced using a separate input waveguide and wherein the path of each signal is perpendicular to an output plane and parallel to an imaginary line, called the optical axis, which is also perpendicular to said output plane and which passes through the center of an optical system and also passes through the center of a diffraction grating;
   b) collimating said signals by passing said signals through said optical system;
   c) dispersing said collimated signals of step b) and reflecting said dispersed signals of step c) using said diffraction grating;
   d) imaging said reflected signals of step c) by passing said reflected signals of step c) through said optical system;
   e) spatially transforming the field positions of said multiple wavelengths of said imaged signals of step d) by inverting said field positions about one or more axes which are orthogonal to the direction of dispersion;
   f) reflecting said spatially transformed signals of step e);
   g) collimating said reflected signals of step f) by passing said reflected signals of step f) through said optical system;
   h) dispersing said collimated signals of step g) and reflecting said dispersed signals of step h) using said diffraction grating; and
   i) imaging said reflected signals of step h) by passing said reflected signals of step h) through said optical system such that each reflected signal of step h) is received at an interface of an output waveguide collinear with the point on said output plane through which said signal of step a) associated with each said reflected signal of step h) passed.

8. The method according to claim 7, wherein the spatial transformation of step e) comprises inverting the field positions of said multiple wavelengths about a single axis which is orthogonal to the direction of dispersion.

9. The method according to claim 7, wherein the spatial transformation of step e) comprises inverting the field positions of said multiple wavelengths about multiple axes each of which is orthogonal to the direction of dispersion.

10. The method according to claim 7, further comprising the steps of:
    rotating the polarization of said collimated, reflected, dispersed signals after step d); and
    rotating the polarization of said reflected, spatially transformed signals after step f) so as to minimize the polarization dependent loss.

11. The method according to claim 7, where the transformation of step e) and reflection of step f) are performed by one or more devices, and further comprising the step of matching the combined linear dispersion of said lens and said diffraction grating with said output waveguides by rotating each of said devices about one of said axes of step e) which are orthogonal to the direction of dispersion and rotating said input waveguides and said output waveguides in the same direction.

12. The method according to claim 11, wherein said device and said input waveguides and said output waveguides are all rotated the same angle, said angle being less than 5°.

13. A method for separating multiple wavelength optical signals comprising the steps of:
    a) dispersing said signals by wavelength in an approximately linear fashion by passing said signals through a first optical system;
    b) transforming said dispersed signals by passing said dispersed signals through a second optical system; and
    c) performing the inverse dispersion of step a), such that if said inverse dispersion were performed immediately after step a) the dispersion of step a) would be nullified, by passing said transformed signals through a third optical system whereby the spatial distribution of the signals is dependent on the wavelength and the transformation of step b), and whereby step b) causes the resulting signals outputted from the third optical system to remain coplanar with the input waveguide despite any displacement of the input waveguide in a direction orthogonal to both the direction of dispersion and the optical axis.

14. The method of claim 13, wherein
    said dispersing performed in step a) is only laterally dispersing said signals by wavelength in an approximately linear fashion by passing said signals through a first optical system; and
    said transforming performed in step b) is only transforming the lateral positions of said laterally dispersed signals by passing said laterally dispersed signals through a second optical system.

15. The method of claim 13, wherein
    said dispersing performed in step a) is only angularly dispersing of said signals by wavelength in an approximately linear fashion by passing said signals through a first optical system; and
    said transforming performed in step b) is only transforming the angular positions of said angularly dispersed signals by passing said angularly dispersed signals through a second optical system.

16. The method of claim 13, wherein
    said dispersing performed in step a) is only both laterally and angularly dispersing said signals by wavelength in an approximately linear fashion by passing said signals through a first optical system; and
    said transforming performed in step b) is only transforming both the lateral and angular positions of said laterally and angularly dispersed signals by passing said laterally and angularly dispersed signals through a second optical system.

* * * * *